United States Patent [19]

Hall

[11] Patent Number: 5,092,687
[45] Date of Patent: Mar. 3, 1992

[54] DIAMOND THRUST BEARING AND METHOD FOR MANUFACTURING SAME

[75] Inventor: David R. Hall, Provo, Utah

[73] Assignee: Anadrill, Inc., Sugar Land, Tex.

[21] Appl. No.: 710,115

[22] Filed: Jun. 4, 1991

[51] Int. Cl.⁵ .............................................. F16C 17/04
[52] U.S. Cl. ..................... 384/303; 384/285; 384/907.1
[58] Field of Search ............ 384/303, 305, 304, 907.1, 384/282, 285

[56] References Cited

U.S. PATENT DOCUMENTS

| | | | |
|---|---|---|---|
| 4,345,798 | 8/1982 | Cortes . | |
| 4,410,054 | 10/1983 | Nagel et al. | 175/107 |
| 4,468,138 | 8/1984 | Nagel | 384/303 |
| 4,560,014 | 12/1985 | Geczy | 175/107 |
| 4,604,106 | 8/1986 | Hall et al. | 51/293 |
| 4,620,601 | 11/1986 | Nagel | 175/107 |
| 4,629,373 | 12/1986 | Hall | 407/118 |
| 4,639,146 | 1/1987 | Yoshioka et al. | 384/99 |
| 4,708,496 | 11/1987 | McPherson | 384/303 |
| 4,710,036 | 12/1987 | Geczy | 384/285 |
| 4,720,199 | 1/1988 | Geczy et al. | 384/282 |
| 4,729,440 | 3/1988 | Hall | 175/107 |
| 4,732,364 | 3/1988 | Seger et al. | 251/369 |
| 4,732,491 | 3/1988 | Geczy | 384/95 |
| 4,789,251 | 12/1988 | McPherson et al. | 384/317 |

OTHER PUBLICATIONS

United States Defensive Publication No. T102,901 by Offenbacher-filed Apr. 5, 1983.

Primary Examiner—Lenard A. Footland
Attorney, Agent, or Firm—Workman, Nydegger & Jensen

[57] ABSTRACT

A diamond thrust beraring and method for manufacturing the diamond thrust bearing wherein diamond bearing pads are interference fitted at ambient temperatures into a plurality of equidistantly spaced bearing pad recesses located in a circle in a receiving surface of a bearing pad retainer. The bearing faces of the diamond bearing pads are located coplanar with a predetermined common bearing plane by pressing the bearing faces into the bearing pad retainer with a ram and inflexible pressing plate until the pressing face of the pressing plate is stopped by a press stop block. The diamond thrust bearing manufactured using the method will be free from heat induced stresses that cause bearing face misalignment.

44 Claims, 7 Drawing Sheets

DIAMOND THRUST BEARING AND METHOD FOR MANUFACTURING SAME

BACKGROUND

I. Field of the Invention

This invention relates to improvements in the structure and method of manufacturing thrust bearings. More particularly, this invention relates to diamond thrust bearings for use in downhole drilling operations and a process for manufacturing same.

II. Background Art

Exploratory bore holes are drilled in the earth to gain access to materials located therein. The cost of exploratory equipment is high, and therefore, many companies prefer to lease exploratory equipment for short-term or sporadic needs. Leased drilling equipment requires large quantities of drilling fluid, skilled manpower, and frequent maintenance. These factors of overhead, when added to the cost of leasing drilling equipment, make even leasing exploratory equipment an expensive process. Downtime from equipment failure or maintenance impinges on the time this expensive equipment is in productive use.

A. The Exploratory Environment

To illustrate the environment in which this exploration takes place, FIG. 1 shows a drill rig 10 erected over a surface 12 of the earth at an area to be explored for oil. A bore hole is drilled below drill rig 10 through surface 12 and strata 13, to a desired depth. Advancement of drilling end 14 into the earth is accomplished by a drill bit 15 which progresses through strata 13 by the action of rotating teeth located on the end thereof.

B. The Downhole Drilling Motor

Drill bit 15 is powered by a downhole drilling motor 16. Downhole drilling motor 16 is located at the end of a series of pipe sections comprising drill string 18. The housing of downhole drilling motor 16 is located in drilling end 14 of drill string 18 and remains stationary with drill string 18 as it powers drill bit 15. Downhole drilling motor 16 is powered by drilling fluid, commonly referred to as drilling mud, which is pumped under pressure through drill string 18 and through downhole drilling motor 16.

Downhole drilling motors such as downhole drilling motor 16 are cylindrical so as to be capable of passing through the bore hole drilled by drill bit 15. Downhole drilling motors must, therefore, conform to the size restriction imposed by the outside diameter of the drill pipe in drill string 18. The length of downhole motor 16, however, often ranges up to thirty feet. Downhole drilling motors utilize the effect of drilling mud pressure and momentum change of drilling mud as it passes through turbine blades to provide torque to turn drill bit 15. Drill bit 15 penetrates earth and rock by a combination of the downward pressure exerted by the weight of drill string 1 and the rotary action imparted to drill bit 15 by downhole drilling motor 16. As the bore hole deepens, additional sections of pipe are added to drill string 18 at drill rig 10.

C. Downhole Thrust Bearings

FIG. 2 illustrates in more detail drilling end 14 of drill string 18 shown in FIG. 1. A casing 17 of downhole drilling motor 16 is shown attached to the last segment of drill string 18. Located within casing 17 of downhole drilling motor 16 are two thrust bearing assemblies, an upper thrust bearing assembly 20 and a lower thrust bearing assembly 21. Downhole drilling motor 16 powers drill bit 15 located at the free end of drilling end 14.

Thrust bearing assemblies 20, 21 allow for the rotation of drill bit 15 relative to casing 17 of downhole drilling motor 16. To maintain the rotation of drill bit 15 when downhole drilling motor 16 is powering drill bit 15, thrust bearing assemblies 20, 21 must be capable of operating under compressive pressure from the weight of drill string 18 and tensile pressure from the force of the pressurized drilling mud passing through downhole drilling motor 16.

1. Off-bottom Thrust

Drilling mud is pumped through drill string 18 to downhole motor 16 in a direction shown by arrow A, a direction referred to as "downhole." The high pressure drilling mud exerts a force downhole on drilling motor 16 that tends to push drilling motor 16 toward the bottom 22 of bore hole 23. This force is referred to as "off-bottom thrust" since the thrust is exerted whenever drilling mud is pumped through downhole drilling motor 16 and drill bit 15 is off the bottom of bore hole 23.

2. On-bottom Thrust

When drill bit 15 is in contact with bottom 22 of bore hole 23, the weight of drill string 18 exerts a force on drilling end 14 which tends to compress drilling motor 16. This force is referred to as "on-bottom thrust," as it is experienced only when drill bit 15 is in contact with bottom 22 of borehole 23.

During drilling, on-bottom thrust caused by the weight of drillstring 18 is countered by off-bottom thrust caused by the hydraulic pressure of the drilling mud. The interaction of on-bottom and off-bottom thrusts lessens the overall thrust that must be borne by thrust bearing assemblies 20, 21, during actual drilling.

Periodically, during the drilling process, drill bit 15 wears out requiring drill string 18 to be pulled up out of bore hole 23 to gain access to drill bit 15. After replacing drill bit 15, drill string 18 is reassembled as drill bit 15 is lowered back into bore hole 23. During this period of lowering drill string 18 back to the previously achieved depth, drilling mud is pumped under pressure through drill string 18 to turn downhole drilling motor 16 and thereby cause drill bit 15 to rotate and clean bore hole 23 as drill bit 15 descends.

The period during which drill bit 15 is descending into bore hole 23 exposes thrust bearing assemblies 20, 21 to offbottom thrusts caused by drilling mud pressing downhole drilling motor 16 in a downhole direction. Thrust bearing assemblies 20, 21, do not have the advantage of offsetting onbottom thrust during this time, and so, must bear the entirety of the off-bottom thrust. Typical on-bottom thrusts may exceed 40,000 pounds and off-bottom thrusts may exceed 30,000 pounds.

3. Diamond Drill Bits

Previously, a typical drill bit would last approximately fifteen hours before needing replacement. To lengthen the interval between drill bit replacement, drill bits were introduced which incorporated synthetic diamonds into the surface of the drill bit. These diamond drill bits have increased the useful life of drill bit 15 from fifteen hours to one hundred fifty hours. This increase in useful life allows much longer intervals before drill-bit replacement is necessary.

Thrust Bearing

D. The Evolution of the Diamond

With the introduction of diamond drill bits, however, a new problem arose. While the new diamond drill bits had a useful life of one hundred fifty hours, the thrust bearings had a useful life of only fifty hours. Thrust bearing assemblies 20, 21 became the limiting factor in downhole operations. When a thrust bearing assembly 20, 21 wears out, drill string 18 must be pulled out of bore hole 23 to access downhole drilling motor 16 and the thrust bearing assemblies 20, 21 contained therein. Thrust bearing assembly failure required drilling to be halted every fifty hours to replace the thrust bearing assemblies 20, 21 in downhole drilling motor 16.

1. Roller Thrust Bearings

To cope with the forces operating on downhole drilling motor 16, the earliest thrust bearings utilized ball bearings travelling in races. Thrust bearing assemblies, such as 20, 21 were positioned at both ends of downhole drilling motor 16 to cope with both on-bottom and off-bottom thrusts. In a first attempt to increase thrust bearing life, ball bearings were replaced with roller bearings to increase the bearing surface carrying the load from on-bottom and offbottom thrusts.

Roller thrust bearings first used in downhole motors had a useful life of approximately fifty hours. Since drill bits used at the introduction of such bearings had a useful life of only fifteen hours, roller thrust bearings were not a limiting factor in causing downtime. Roller thrust bearings were simply replaced concurrently with drill bit 15 after several intervening drill bit changes. With the introduction of diamond drill bits 15, however, roller thrust bearings became a limiting factor in the efficient use of drilling equipment. The solution to this disparity in useful life between diamond drill bit 15 and roller thrust bearings was to develop thrust bearings with longer useful lifetimes. This was accomplished by incorporating synthetic diamonds into the bearing surfaces of thrust bearings 20, 21.

2. Diamond Thrust Bearings

Diamond thrust bearings are paired to create thrust bearing assemblies 20, 21 like those shown in FIG. 3. Each diamond thrust bearing is manufactured with diamond bearing pad retainer 28 having interference fitted within bearing pad recesses a plurality of diamond bearing pads like bearing pad 26. Diamond bearing pad 26 is cylindrical and comprises a bearing end 32 terminating in a substantially planar bearing face 34. Opposite bearing end 32 is an insertion end 36 which is held in bearing pad retainer 28. Insertion end 36 has a bevel 37 to facilitate insertion into the bearing pad retainer 28. Diamond bearing pad 26 is often constructed of tungsten carbide in which the synthetic diamonds are bonded. The synthetic diamonds of substantially planar bearing face 34 give diamond thrust bearings a useful life that approximates that of diamond drill bits like drill bit 15, substantially increasing the productive operational time that drilling equipment is in use in a given period.

As illustrated in FIG. 4, diamond bearing pads 26 are typically arranged in a circle inside of an annular bearing pad retainer 28. Bearing end 32 projects above a receiving surface 40 and terminates in substantially planar bearing face 34.

Thrust bearing assembly 21 comprises two thrust bearings 29 like that illustrated in FIG. 4. Two thrust bearings 29 are located such that the substantially planar bearing faces 34 of diamond bearing pads 26 of one bearing pad retainer are in contact with the corresponding substantially planar bearing faces 34 of the opposing bearing pad retainer. This orientation assures uniform contact between all diamond bearing faces 34 contributing to the longer useful life of diamond thrust bearing assemblies.

3. The Predetermined Common Bearing Plane

Maximizing the load-carrying capacity of two opposing thrust bearings 29 requires that the load carried by bearing pad retainer 28 be spread over the maximum bearing surface of all of diamond bearing pads 26. To accomplish this, the substantially planar bearing faces 34 of each diamond bearing pad 26 must be parallel with the bearing faces 34 of diamond bearing pads 26 of the opposing bearing pad retainer.

Maximizing the total bearing surface of the overall thrust bearing 29, requires that all bearing faces 34 in each thrust bearing 29 be disposed and must remain disposed coplanar with each other in a theoretical predetermined common bearing plane. Any deviation of a bearing face out of the predetermined common bearing plane contributes to premature thrust bearing failure, as some diamond bearing pads 26 are required to carry a greater load than the others in the bearing pad retainer 28.

4. Bearing Pad Recess Depth

To produce a thrust bearing 29, bearing pad recesses 42 are drilled to precise depths in bearing pad retainer 28. This method requires equipment capable of drilling bearing pad recesses with precise tolerances on a continual basis. This equipment requires frequent adjustment, as the drill bit wears from drilling the bearing pad recesses in the hard bearing pad retainer. This need for constant adjustment results in bearing pad recesses 42 that vary slightly in their dimensions.

As diamond bearing pads 26 are inserted into bearing pad recesses 42, any deviation in bearing pad recess depth results in substantially planar bearing faces 34 that are no longer coplanar with the predetermined common bearing plane.

5. Brazing

To retain diamond bearing pads 26 in bearing pad recesses 42 during drilling operations, diamond bearing pads 26 are brazed into bearing pad recesses 42. Flux is placed in the bottom of each of the bearing pad recesses 42 followed by a diamond bearing pad 26. Bearing pad retainer 28 is then heated to a temperature high enough to braze diamond bearing pad 26 to bearing pad recesses 42. Bearing pad retainer 28 is then cooled to ambient temperature.

As bearing pad retainer 28 cools, however, heat distortion of bearing pad retainer 28 may occur. This heat distortion may cause misalignment of substantially planar bearing pad retainers elevate some bearing faces 34 out of the predetermined common bearing plane, thereby causing some bearing faces 34 to carry more thrust loading than others.

Heat distortion of even a very small degree can result in premature thrust bearing failure. Small distortions caused by heating bearing pad retainer 28 during the brazing process are difficult to discover and are, therefore, difficult to eliminate. Processes designed to establish substantially planar bearing faces 34 coplanar with the predetermined bearing plane during brazing are ineffective in maintaining substantially planar bearing faces 34 in a coplanar orientation during cooling.

OBJECTS AND BRIEF SUMMARY OF THE INVENTION

Accordingly, one object of the present invention is to reduce the cost of drilling oil wells for exploration and production, thereby reducing the cost of petroleum products to the consumer.

Another object of the present invention is to provide an improved thrust bearing that lengthens the operating time of leased equipment during the term of the lease.

A further object of the present invention is to reduce the time needed for maintenance and repair of thrust bearings by providing an improved thrust bearing with a useful lifetime approximately equal to that of a diamond drill bit thereby allowing both parts to be replaced simultaneously.

Another object of the present invention is to provide an improved thrust bearing with bearing faces that are all coincident with a predetermined common bearing plane.

A further object of the present invention is to provide an improved thrust bearing that is not dependent on repeated drilling tool adjustment to achieve uniform recess depth and planar alignment of the bearing faces in a predetermined common bearing plane.

A still further object of the present invention is to provide an improved thrust bearing that is capable of maintaining the substantially planar bearing faces of the diamond bearing pads in the predetermined bearing plane when the diamond bearing pads are subjected to the dynamic stresses caused by on-bottom and off-bottom thrusts.

Another object of the present invention is to provide a method of thrust bearing manufacture which overcomes bearing face misalignment from heat-induced stresses imposed by the manufacturing process.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a diamond thrust bearing is provided for use in downhole drilling operations. The diamond thrust bearing is comprised of a bearing pad retainer, a plurality of malleable shims, and a plurality of diamond bearing pads. The bearing pad retainer is an annular plate having a plurality of bearing pad recesses formed in a receiving surface thereof. The bearing pad recesses are equidistantly spaced in a circle concentric with the bearing pad retainer. Each of the bearing pad recesses comprise a receiving end in the receiving surface of the bearing pad retainer, an insertion chamber, and a deformation end contiguous with the bottom of the insertion chamber. In addition, an overflow chamber is formed in the deformation end of the insertion chamber.

One of the plurality of malleable shims is cold pressed in each of the bearing pad recesses in the deformation end of the bearing pad recess. The malleable shims each have an upper surface that supports the diamond bearing pad and a lower surface which is cold pressed into the deformation end of the bearing pad recess as the diamond bearing pad is inserted at ambient temperature. A portion of the malleable shim that exceeds the capacity of the deformation end of the bearing pad recess is cold formed into the overflow chamber as the lower surface of the malleable shim is cold pressed into the deformation end of the bearing pad recess during insertion of the diamond bearing pad.

Each of the plurality of diamond bearing pads comprises an insertion end, and a bearing end. The insertion end is interference fitted into a corresponding one of the bearing pad recesses into the insertion chamber. The bearing end projects from the receiving surface of the bearing pad retainer and terminates in a substantially planar bearing face. The substantially planar bearing faces of all of the plurality of diamond bearing pads are coplanar with a predetermined common bearing plane.

To manufacture the diamond thrust bearing, a press is provided to position diamond bearing pads into the bearing pad recesses in the receiving surface of the bearing pad retainer. The press positions the substantially planar bearing faces of the diamond bearing pads in a predetermined common bearing plane by pressing until a locating means is encountered.

The press is made up of a press table, a ram, an inflexible pressing plate, and a locating means for limiting the travel of a pressing face of the inflexible pressing plate to a position coplanar with the predetermined common bearing plane.

The press table is provided to support the bearing pad retainer during pressing by the ram. The ram is capable of producing a pressure exceeding the pressure exerted on less than all of the diamond bearing pads by off-bottom thrust during drilling operations. The ram presses on an inflexible pressing plate with a pressing face which presses three of the diamond bearing pads into three of the bearing pad recesses. The inflexible pressing plate travels until its pressing face is stopped by the locating means.

One embodiment of the locating means comprises a press stop block that is placed inside the bearing pad retainer on the press table. The press stop block has a planar surface that is coplanar with the predetermined common bearing plane. When the pressing face of the inflexible plate encounters the press stop block, travel of the pressing plate is stopped and the bearing faces of the diamond bearing pads are positioned coplanar with the predetermined common bearing plane.

The invention also contemplates a method for manufacturing the diamond thrust bearing.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1:
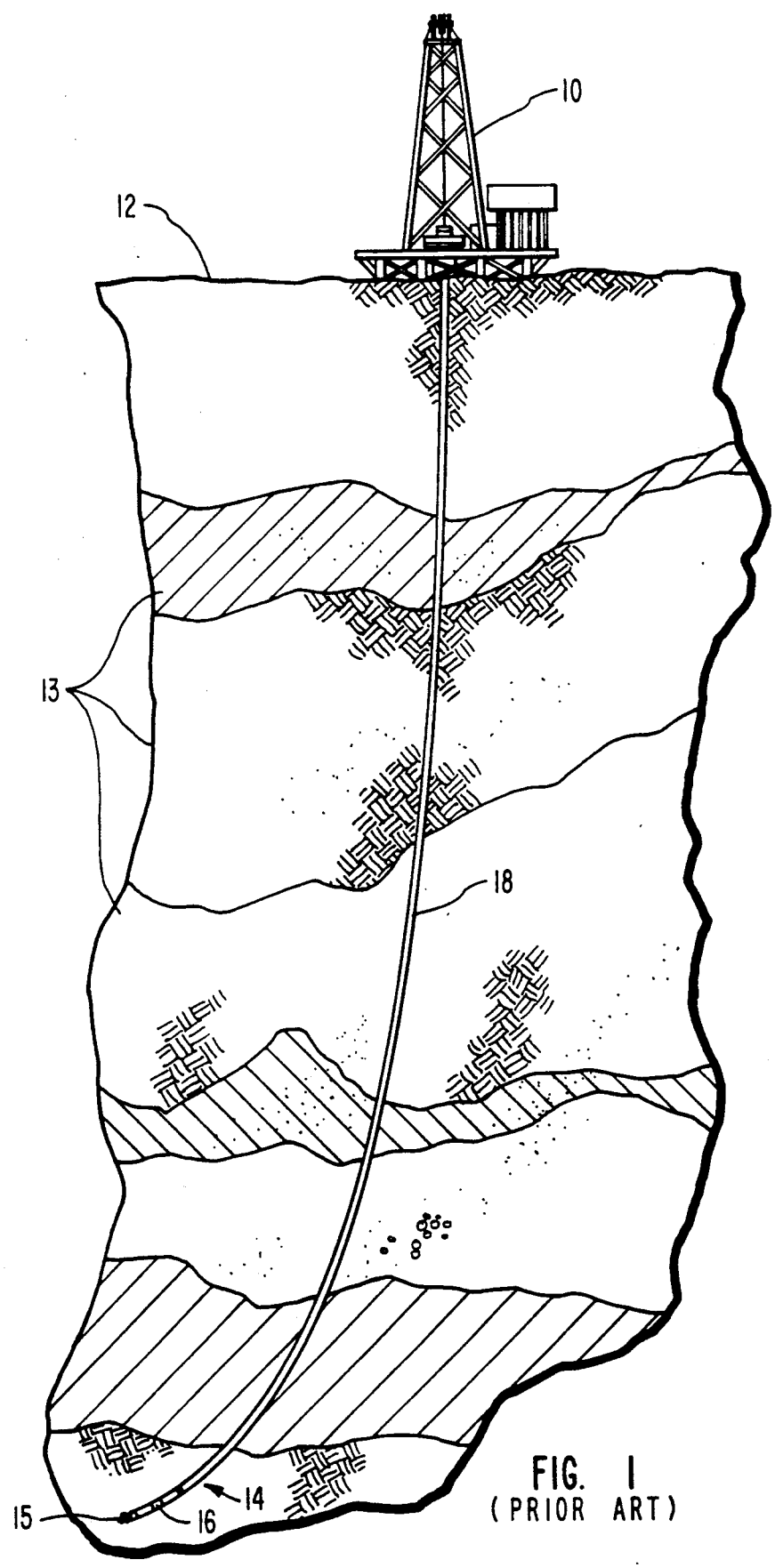
FIG. 1 is a schematic view of the environment in which the inventive thrust bearing is used, showing a drilling rig, a drill string, a hydraulic downhole drilling motor, and a drill bit at the drilling end of the drill string.
Figure 2:
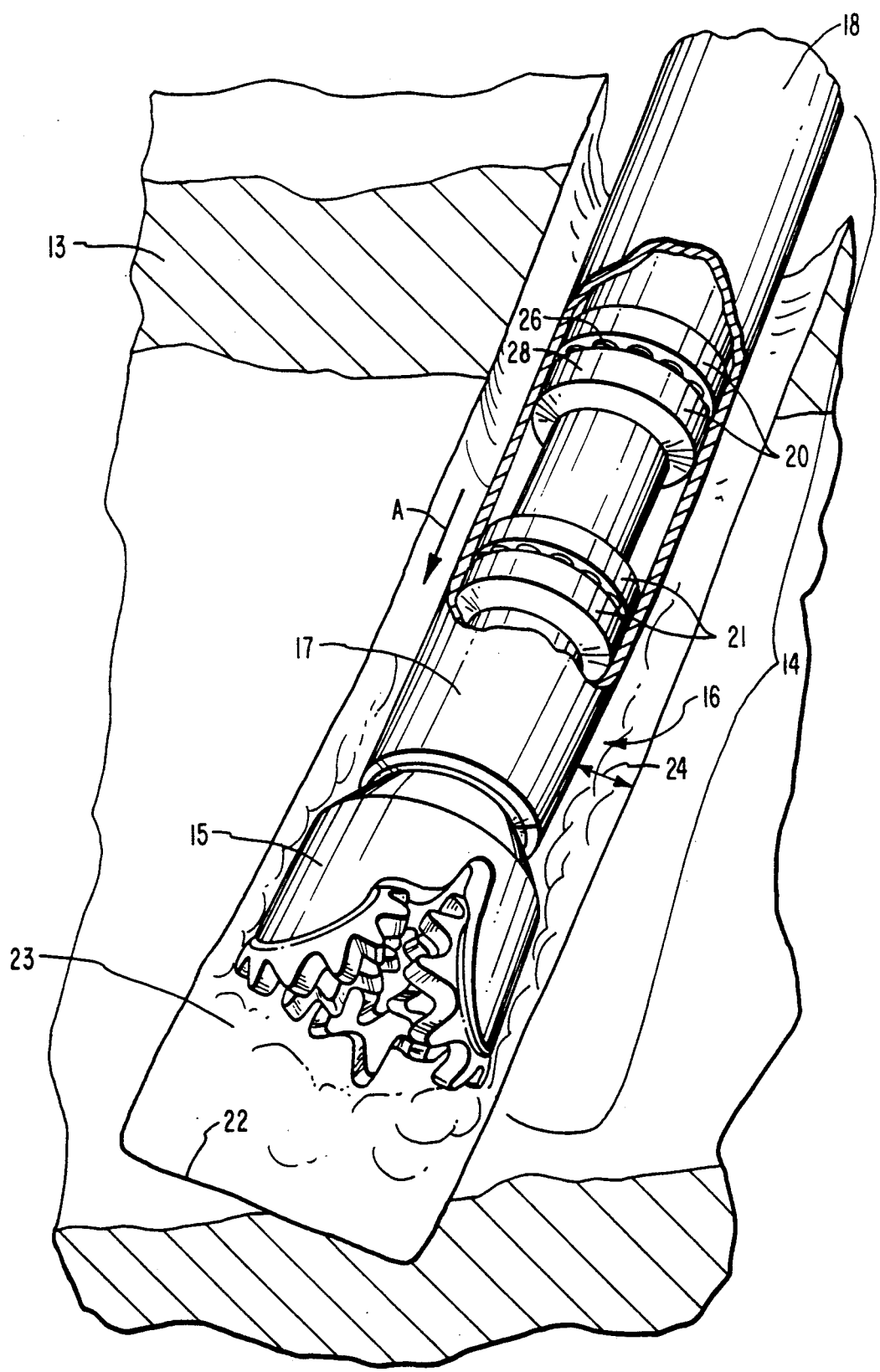
FIG. 2 is an enlarged schematic view of the drilling end of the drill string of FIG. 1.
Figure 3:
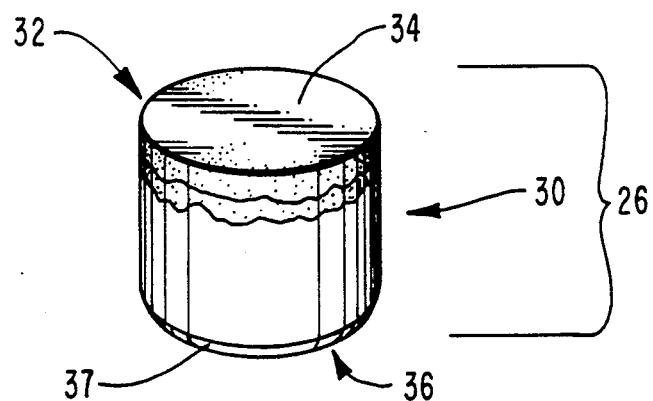
FIG. 3 is an enlarged perspective view of a diamond bearing pad from the thrust bearing assembly shown in FIG. 2.
Figure 4:
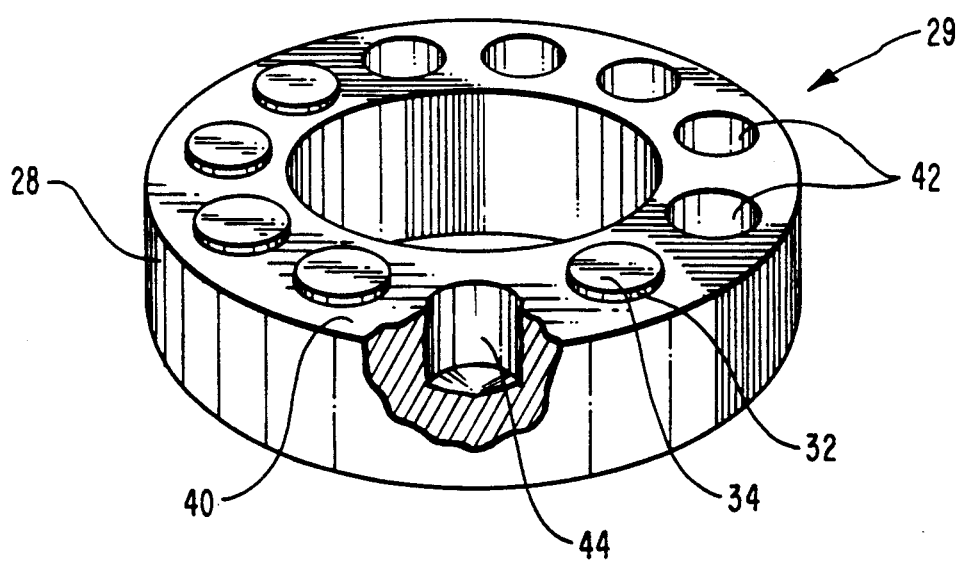
FIG. 4 is a cutaway view of one of the thrust bearings shown in the thrust bearing assembly in FIG. 2.
Figure 5:
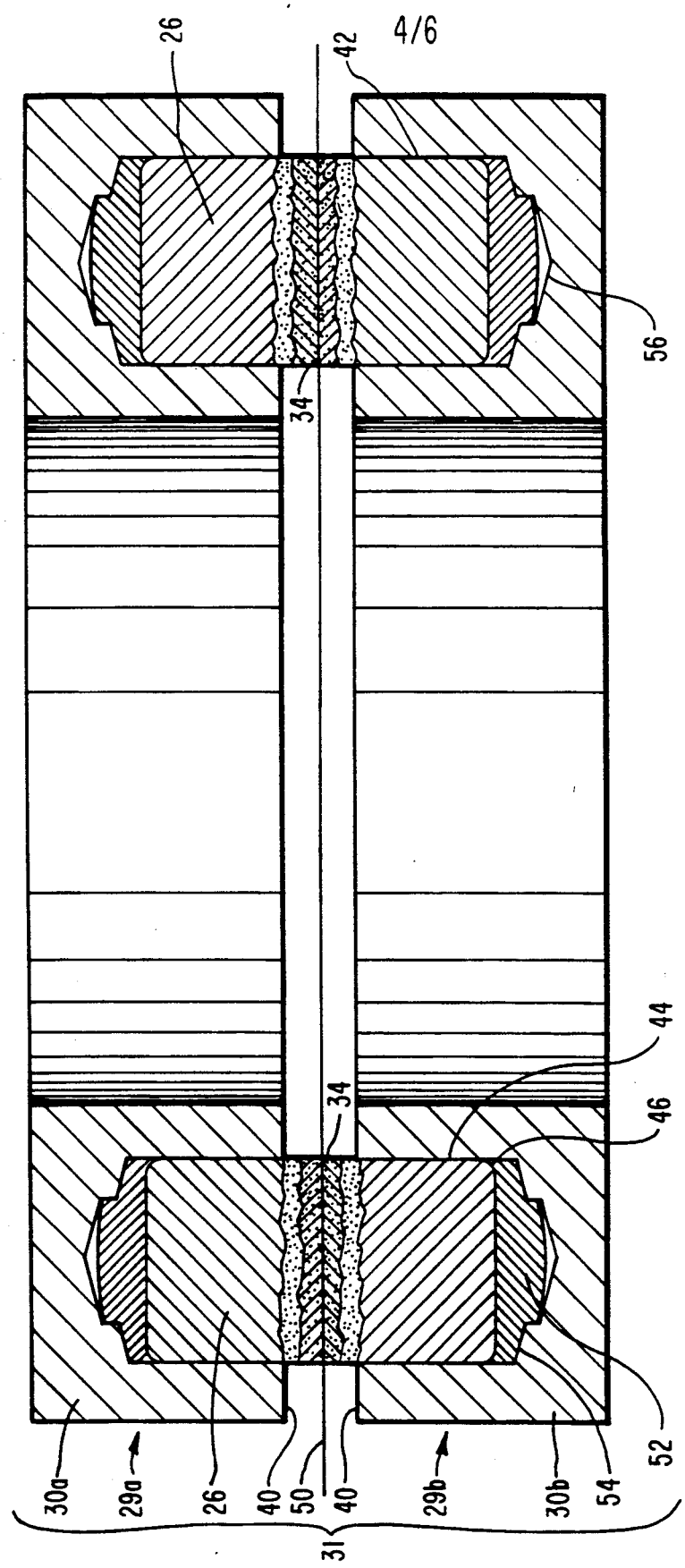
FIG. 5 is a cross-sectional view of a thrust bearing incorporating the teachings of the present invention.

FIG. 5 is a cross section of a thrust bearing assembly functioning in the same location as thrust bearing assembly 21, shown in FIG. 1, but incorporating the teachings of the present invention. Two bearing pad retainers, a first bearing pad retainer 30a and a second bearing pad retainer 30b, make up thrust bearing assembly 31.

In the preferred embodiment illustrated in FIG. 5, bearing pad retainers 30a, 30b are both annular. Bearing pad retainer 30b has a receiving surface 40 in which a plurality of bearing pad recesses 42 are formed. By way of example and not limitation, diamond bearing pads 26 are equidistantly spaced from each other in receiving surface 40 of bearing pad retainer 30b in a circle concentric with bearing pad retainer 30b.

Bearing pad recess 42 has a cross-sectional shape that is circular, like that of diamond bearing pad 26 which is held therein. Diamond bearing pads 26 are spaced about bearing pad retainer 30 so that the distance between each of diamond bearing pads 26 is less than the outside diameter of diamond bearing pads 26. This spacing assures that two thrust bearings 30a, 30b will have a planar interface without depressions in which a diamond bearing pad 26 could become caught. The spacing also provides egress for the drilling fluid being pumped through downhole drilling motor 16. The passage of drilling fluid through the spaces between diamond bearing pads 26 cools thrust bearing 30a.

Each of bearing pad recesses 42 comprise an insertion chamber formed in receiving surface 40 of bearing pad retainer 30b. Each of the plurality of diamond bearing pads 26 has a diameter which is greater than the diameter of each of the plurality of bearing pad recesses 42. The difference between the outside diameter of each of the plurality of diamond bearing pads 26 and the inside diameter of each of the bearing pad recesses 42 is in a tolerance range from about 0.003 to about 0.0002 inches. The disparity in the diameters of bearing pad recesses 42 and diamond bearing pads 26 creates an interference fit that enables bearing bad retainers 30a, 30b, to hold diamond bearing pads 26 in place during drilling operations.

To overcome the disparity in diameters, a device capable of generating high compressive force is used to press diamond bearing pad 26 into bearing pad recess 42. To facilitate the insertion of diamond bearing pad 26 into bearing pad recess 42, insertion end 46 of diamond bearing pad 26 is beveled 47. Diamond bearing pads 26 are interference fitted in groups of two or three at a time. An interference fit exceeding the larger limits of the tolerance range would produce a strain that would accumulate in the remaining empty bearing pad recesses 42 as each diamond bearing pad 26 was interference fitted. This accumulated strain would result in a bearing pad retainer 30 that was broken or severely stressed by insertion of the last diamond bearing pads 26.

A diamond bearing pad 26 which is interference fitted with a tolerance below the smaller end of the range will result in a bearing pad retainer 30a that cannot retain diamond bearing pads 26 during drilling operations.

In the thrust bearing assembly illustrated in FIG. 5, bearing pad retainer 30a is located with the receiving surface 40 thereof juxtaposed to receiving surface 40 of bearing pad retainer 30b. In this orientation, substantially planar bearing faces 34 of bearing pad retainer 30b are in direct contact with the substantially planar bearing faces 34 of bearing pad retainer 30a in a predetermined bearing plane.

To more fully understand the orientation of substantially planar bearing faces 34 in thrust bearing assembly 21, FIG. 5 illustrates a cross-section of thrust bearing assembly 21 showing the contact between opposing substantially planar bearing faces 34. This contact occurs in a predetermined common bearing plane 50. All of the plurality of diamond bearing pads 26 must have bearing faces 34 coincident with the predetermined bearing plane 50 if on-bottom and off-bottom thrusts are to be evenly distributed over the entire thrust bearing 29.

As used herein, when referring to the substantially planar bearing faces 34, the term "substantially planar" is intended to include bearing faces which may exhibit a planar face on only a portion of the exposed bearing face. Such bearing faces may include frustoconics and other geometric shapes with a planar surface incorporated into one of their faces. Such planar faces may be interrupted by grooves, striations, or other indentations that do not protrude outward from the planar face. Due to the unique nature of synthetic diamonds, juxtaposed diamond faces wear well in contact with other synthetic diamonds. Because diamonds have a low coefficient of friction and are able to bear on surfaces composed of like materials, it is not necessary that diamond bearing pads have the large planar surfaces necessary with other materials. One advantage deriving from the use of diamond bearing faces is that the useful life of thrust bearings utilizing diamond bearing faces approximates the useful life of diamond drill bits. Concomitant replacement of both the drill bit and the thrust bearing results in a reduction in the downtime needed for maintenance and repair.

During drilling operations, thrust bearing assembly 21 is subjected to on-bottom and off-bottom thrusts in addition to shocks from drill bit 15 as it encounters varying strata. As pipe sections are added to drill string 18, and as downhole components wear out, thrust bearing assembly 31 must bear alternating full on-bottom and off-bottom thrusts. These varying forces create an environment that causes diamond bearing pad 26 to pivot within bearing pad recess 42 as alternating thrusts are applied during the raising and lowering of drill string 18.

According to one aspect of the present invention, a support means for maintaining substantially planar bearing faces in a predetermined common bearing plane is provided which is cold formed in the bottom of each of the plurality of bearing pad recesses.

By way of example and not limitation, the support means in the preferred embodiment comprises a malleable shim 52 located in the bottom of bearing pad recess 42 in a shim deformation end 54 thereof. Shim deformation end 54 is located in the bottom of bearing pad recess 42 contiguous with insertion chamber 44. A portion of malleable shim 52 is cold formed in an overflow chamber 56 capable of accepting some of malleable shim 52. It is important that overflow chamber 56 be so sized as to be capable of remaining partially unfilled by malleable shim 52. Total filling of overflow chamber 52 would result in resistance to insertion of diamond bearing pad 26 and possibly prevent bearing face 34 from being pressed coplanar with the predetermined common bearing plane 50.

As used herein, the term "cold pressed" indicates a pressure applied to a malleable shim without heat that results in no deformation of the malleable shim.

The term "cold formed" indicates a pressure applied to a malleable shim without heat that results in shim deformation. For a shim to be cold formed, it must therefore be cold pressed to a point of deformation at which time it will be cold formed. The term cold formed includes cold pressing. In the preferred embodiment illustrated in FIG. 5, a malleable shim 52 is cold formed into a shim deformation end 54 of bearing pad recess 42. To maintain bearing face 34 of diamond bearing pad 26 in coplanar orientation with the predetermined common bearing plane 50 under the dynamic conditions of drilling, malleable shim 52 supports insertion end 36 of diamond bearing pad 26.

Malleable shim 52 is comprised of a material such as copper or aluminum that will resist the movements of diamond bearing pad 26 and yet will not melt when exposed to the heat generated by normal drilling conditions. By resisting the movement of diamond bearing pad 26, the malleable shim acts as a spring to return diamond bearing pad 26 to a coplanar position in predetermined common bearing plane 50.

Malleable shim 52 may also be comprised of other materials which provide sufficient resistance to plastic strain such as aluminum, brass, or silver. A material chosen for a malleable shim must exhibit three characteristics to perform adequately. The material must have a lower elastic modulus than bearing pad retainer 30, sufficient elastic strength to resist hardening, and must not melt at normal operational drilling temperatures.

First, an elastic modulus lower than bearing pad retainer 30 is required so that as forces are exerted on substantially planar bearing face 34, malleable shim 52 will be temporarily compressed, then regain its previous shape. Because of the elastic character of the material chosen for malleable shim 52, it can spring back and reorient substantially planar bearing face 34 to a position coplanar with predetermined bearing plane 50. If the modulus of elasticity were higher than bearing pad retainer 30, bearing pad retainer 30 would be deflected before malleable shim 52 and would allow diamond bearing pad 26 to shift out of the predetermined common bearing plane and remain in that position. It is therefore desirable to choose malleable shim 52 with a lower elastic modulus than bearing pad retainer 30 so that malleable shim 52 will deflect and absorb shocks before bearing pad retainer 30 does.

Second, the material chosen must have sufficient elastic strength to be able to resist work hardening after repeated strain. Some materials with an appropriate modulus of elasticity may not have sufficient elastic strength to repeatedly be deflected and return to their original shape. After repeated deflection, some materials lose their elasticity and become work hardened.

Third, in addition to serving as a support for diamond bearing pad 26, malleable shim 52 serves as a heat sink to remove from bearing pad 26 heat that is developed in therein from friction at bearing face 34. Very high heat in bearing pad 26 will lead to premature failure of thrust bearings 29A and 29B. It is, therefore, important to choose a malleable shim that has the highest heat conductivity possible to carry away accumulating heat from diamond bearing pad 26.

Fourth, even though malleable shim 52 has a high heat conductivity, the passage of heat through malleable shim 52 causes elevated temperatures within malleable shim 52. In order for malleable shim 52 to continue to support bearing pad 26 under this elevated temperature, malleable shim 52 must also have a high thermal capacity. If malleable shim 52 does not possess the necessary thermal capacity, it will melt under the elevated temperatures of operation and will fail to provide the required support for bearing pad 26.

To satisfy all of the requirements discussed above, a malleable shim of copper approximately one eighth of an inch thickness is used in the preferred embodiment of the present invention. It will be appreciated, however, that the four requirements set forth above are only by way of example and, although desirable, are not all necessary to satisfy the teachings of the present invention.

The use of malleable shim 52 results in a thrust bearing that is capable of maintaining the substantially planar bearing faces of the diamond bearing pads in the predetermined bearing plane when the diamond bearing pads are being subjected to the dynamic stresses caused by on-bottom and offbottom thrusts.

An additional advantage deriving from the use of a cold formed malleable shim is that the resulting bearing pad retainer is free from heat induced stresses. The bearing pad retainer will not experience heat during the process, and so has no possibility of altering the bearing face alignment during some cooling stage of manufacturing required of brazed bearing pad retainers.

FIGS. 6, 7, 8, and 9 illustrate the steps of a method for manufacturing the thrust bearing illustrated in FIG. 5.

Figure 6:
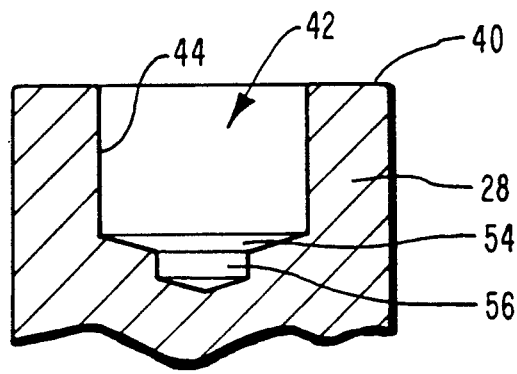
FIGS. 6-8 are schematic views illustrating the steps of a method utilized according to the teachings of the present invention to manufacture the thrust bearing of FIG. 5.

FIG. 6 illustrates the step of forming in a bearing pad retainer a bearing pad recess. Bearing pad recess 42 is located in receiving surface 40. Bearing pad recess 42 comprises insertion chamber 44, shim deformation end 54, and overflow chamber 56. The three components of bearing pad recess 42 are formed in bearing pad retainer 30 with a drill. After forming a plurality of bearing pad recesses 42, malleable shim 52 is introduced into insertion chamber 44. Malleable shim 52 is disk-shaped and is so sized as to lay flat when placed in the bottom of insertion chamber 44.

Figure 7:
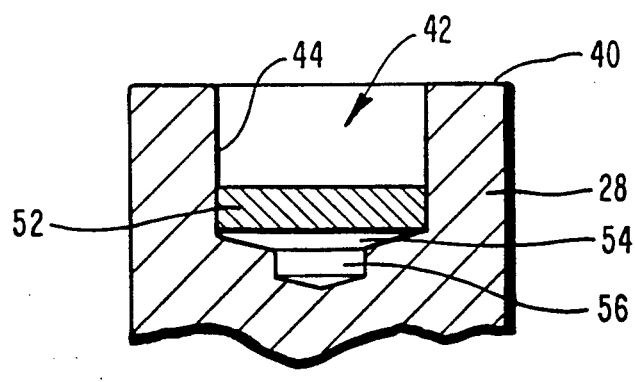

FIG. 7 depicts the step of placing malleable shim 52 into the bottom of bearing pad recess 42. Malleable shim 52 rests on shim deformation end 54 directly above overflow chamber 56.

Figure 8:
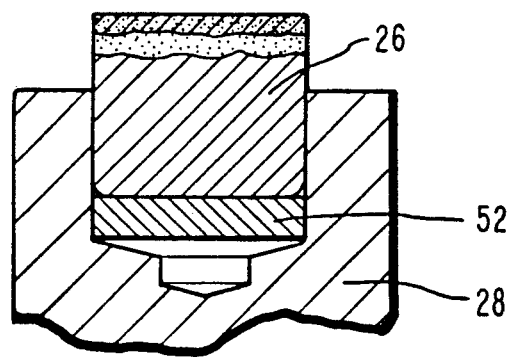

FIG. 8 depicts the step of press fitting at ambient temperature each of the plurality of diamond bearing pads 26 into a corresponding one of the plurality of insertion chambers 44 of bearing pad recesses 42. Diamond bearing pad 26 must be pressed into bearing pad recess 42 to attain the interference fit necessary to retain diamond bearing pad 26 in bearing pad retainer 30 during drilling operations. The pressure used in pressing diamond bearing pad 26 into bearing pad recess 42 must exceed the on-bottom and off-bottom pressures that will be experienced during drilling operations.

Figure 9:
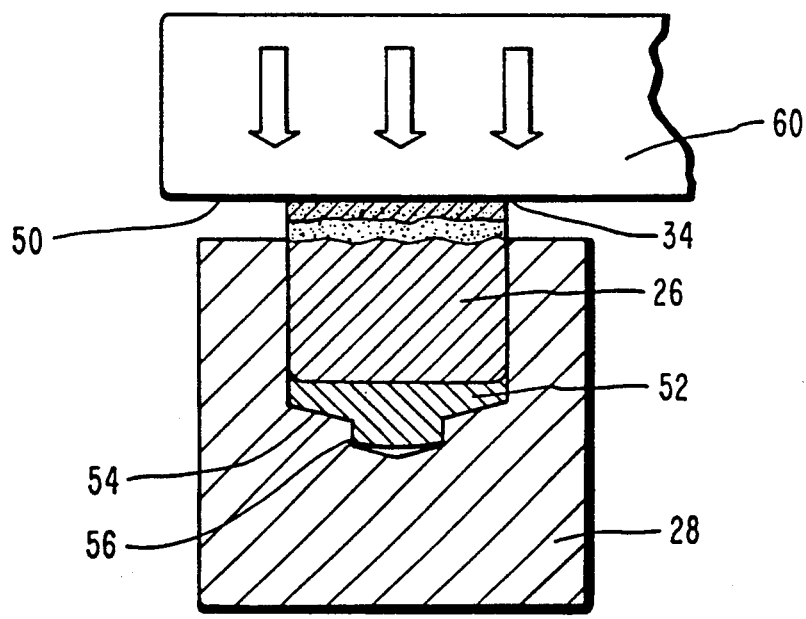
FIG. 9 illustrates an apparatus for performing the steps of the method illustrated in FIGS. 6-8.

FIG. 9 illustrates the cold forming of malleable shim 52 into shim deformation end 54 and overflow chamber 56. An inflexible pressing plate 60 presses some of the plurality of diamond bearing pads 26 into their corresponding bearing pad recesses 42 simultaneously. In the preferred embodiment of the present invention, three diamond bearing pads 26 are pressed simultaneously. Inflexible pressing plate 60 assures that the planar bearing faces 34 are coplanar with each other and with predetermined common bearing plane 50.

Figure 10:
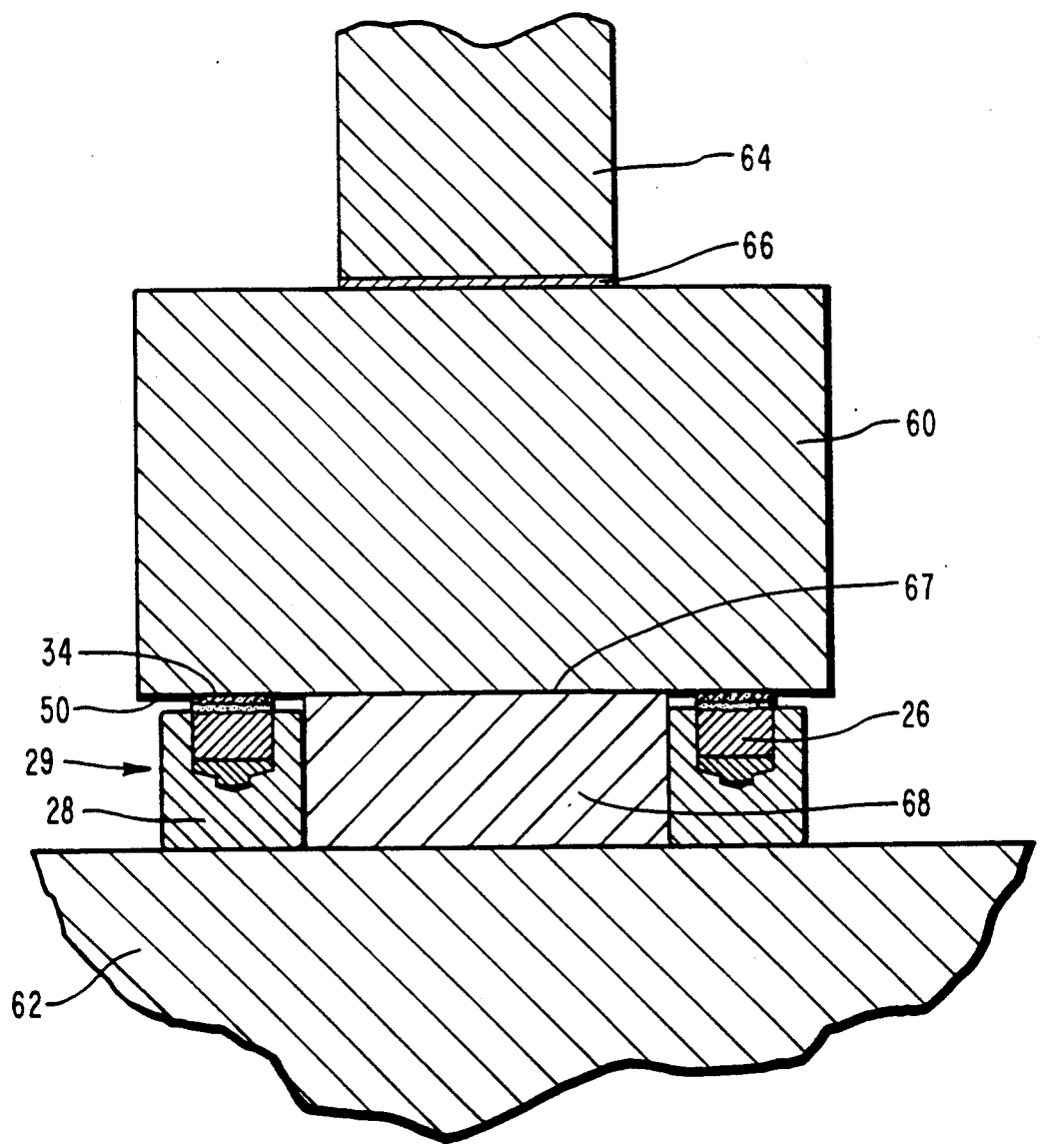

FIG. 10 illustrates an apparatus for use in manufacturing thrust bearing 29. A press table 62 supports bearing pad retainer 30 during pressing. A ram 64 applies pressure to inflexible pressing plate 60. Between ram 64 and pressing plate 60 is a compensating shim 66. Compensating shim 66 is capable of absorbing uneven pressure caused by nonparallel orientation between ram 64 and pressing plate 60.

The press illustrated in FIG. 10 has a locating means for limiting the travel of a pressing face 67 of pressing plate 60 to a position wherein pressing face 67 is coplanar with the predetermined common bearing plane. By way of example and not limitation, one example of a locating means is a press stop block 68. Press stop block 68 halts the progress of pressing face 67 of pressing plate 60 at a point wherein bearing face 34 of diamond bearing pad 26 is coplanar with the predetermined common bearing plane 50.

It will be appreciated that the locating means of the present invention is not limited to a press stop block, but may take the form of a beam that is broken by the passing of the pressing face of the inflexible pressing plate, or an electronic sensor that measures and limits the travel of the ram or the inflexible pressing plate at a point wherein the bearing face of the diamond bearing pad is coplanar with the predetermined bearing plane.

The result of pressing the bearing faces of the diamond bearing pads coincident with the predetermined bearing plane is that the thrust bearing is not dependent on repeated drilling tool adjustment to achieve uniform recess depth and planar alignment of the bearing faces. Variations in recess depth and tolerances will be accommodated as the diamond bearing pad deforms the malleable shim into the overflow chamber. The inflexible pressing plate forces the diamond bearing pad into the bearing pad recess to a point where the bearing face is coplanar with the predetermined bearing plane.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A diamond thrust bearing for use in downhole drilling operations, said thrust bearing comprising:
   (a) a bearing pad retainer having a plurality of bearing pad recesses formed in a receiving surface thereof;
   (b) a plurality of diamond bearing pads, each of said diamond bearing pads being interference fitted into a corresponding one of said bearing pad recesses, and each of said diamond bearing pads comprising:
      (i) an insertion end interference fitted into said corresponding one of said bearing pad recesses; and
      (ii) a bearing end projecting from said receiving surface of said bearing pad retainer and terminating in a substantially planar bearing face, said substantially planar bearing face being coplanar in a predetermined bearing plane with the bearing faces of all of said plurality of diamond bearing pads; and
   (c) support means for maintaining said substantially planar bearing faces in said predetermined bearing plane, said support means being cold pressed in each of said plurality of bearing pad recesses.

2. A diamond thrust bearing as recited in claim 1, wherein said bearing pad retainer is free from heat induced stresses.

3. A diamond thrust bearing as recited in claim 1, wherein said plurality of bearing pad recesses each comprise an insertion chamber formed in said receiving surface of said bearing pad retainer, said insertion chamber having an open receiving end in said receiving surface capable of accepting said support means and a deformation end in which said support means is cold pressed.

4. A diamond thrust bearing as recited in claim 3, wherein said insertion chamber has a cross-sectional shape that is the same as that of said diamond bearing pad.

5. A diamond thrust bearing as recited in claim 4, wherein said diamond bearing pad has a cross-sectional shape that is circular.

6. A diamond thrust bearing as recited in claim 3, wherein each of said bearing pad recesses further comprises an overflow chamber formed in said deformation end of said insertion chamber, said overflow chamber being configured so as to be capable of receiving a part of said support means cold formed therein during cold forming.

7. A diamond thrust bearing as recited in claim 6, wherein each of said overflow chambers are configured to provide capacity in excess of that needed to accept that portion of said support means cold formed therein during cold pressing.

8. A diamond thrust bearing as recited in claim 7, wherein said support means are cold formed into a part of said overflow chamber at said deformation end of said bearing pad recess.

9. A diamond thrust bearing as recited in claim 6, wherein said support means is cold formed at ambient temperature.

10. A diamond thrust bearing as recited in claim 6, wherein said support means is cold formed at a temperature range from about 125° C. to about 0° C.

11. A diamond thrust bearing as recited in claim 6, wherein said support means is cold formed at a temperature range from about 75° C. to about 10° C.

12. A diamond thrust bearing as recited in claim 6, wherein said support means is cold formed at a temperature range from about 35° C. to about 20° C.

13. A diamond thrust bearing as recited in claim 3, wherein said insertion end of said diamond bearing pad is beveled to facilitate insertion of said diamond bearing pad into said open receiving end of said insertion chamber.

14. A diamond thrust bearing as recited in claim 1, wherein said bearing pad retainer comprises an annular plate with a substantially planar receiving surface.

15. A diamond thrust bearing as recited in claim 1, wherein said plurality of diamond bearing pads each have a diameter greater than the diameter of each of said plurality of bearing pad recesses and are interference fitted therein.

16. A diamond thrust bearing as recited in claim 15, wherein said outside diameter of each of said plurality of diamond bearing pads is in a range that exceeds the inside diameter of each of said plurality of bearing pad recesses by about 0.003 to about 0.0008 inches.

17. A diamond thrust bearing as recited in claim 15, wherein said outside diameter of each of said plurality of diamond bearing pads in a range that exceeds the inside diameter of each of said plurality of bearing pad recesses by about 0.001 to about 0.0002 inches.

18. A diamond thrust bearing as recited in claim 1, wherein said plurality of bearing pad recesses are equidistantly spaced in said receiving surface of said bearing pad retainer in a circle concentric with said bearing pad retainer.

19. A diamond thrust bearing as recited in claim 18, wherein said plurality of bearing pad recesses are spaced about said bearing pad retainer so that the distance between each of said bearing pad recesses is less than the outside diameter of said diamond bearing pad.

20. A diamond thrust bearing as recited in claim 1, wherein said support means comprises a plurality of malleable shims, each of said malleable shims having an upper surface and a lower surface, said upper surface supporting said insertion end of each of said diamond bearing pads and said lower surface being cold pressed against the bottom of a corresponding one of said bearing pad recesses.

21. A diamond thrust bearing as recited in claim 20, wherein said malleable shims are comprised of aluminum.

22. A diamond thrust bearing as recited in claim 20, wherein said malleable shims are comprised of brass.

23. A diamond thrust bearing as recited in claim 1, wherein said substantially planar bearing face of said diamond bearing pad is comprised of polycrystalline diamond.

24. A diamond thrust bearing as recited in claim 1, wherein said support means is cold pressed at ambient temperature.

25. A diamond thrust bearing for use in downhole drilling operations, said thrust bearing comprising:
  (a) a bearing pad retainer having a plurality of bearing pad recesses formed in a receiving surface thereof, said bearing pad recesses having an insertion chamber, a receiving end in said receiving surface and a deformation end in the bottom thereof;
  (b) a plurality of diamond bearing pads, each of said diamond bearing pads being interference fitted into a corresponding one of said bearing pad recesses, and each of said diamond bearing pads comprising:
    (i) an insertion end interference fitted into said corresponding one of said bearing pad recesses; and
    (ii) a bearing end projecting from said receiving surface of said bearing pad retainer and terminating in a substantially planar bearing face, said substantially planar bearing face being coplanar in a predetermined bearing plane with the bearing faces of all of said plurality of diamond bearing pads; and
  (c) a plurality of malleable shims, one malleable shim cold pressed in each of said plurality of bearing pad recesses for maintaining said substantially planar bearing faces of said plurality of diamond bearing pads in said predetermined bearing plane.

26. A diamond thrust bearing as recited in claim 25, wherein said bearing pad retainer is free of heat induced stresses.

27. A diamond thrust bearing as recited in claim 25, wherein said plurality of malleable shims each have an upper surface and a lower surface, said upper surface supporting said diamond bearing pad and said lower surface being cold formed into said deformation end of a corresponding one of said bearing pad recesses during cold pressing.

28. A diamond thrust bearing as recited in claim 27, wherein said malleable shim is cold formed at a temperature range from about 125° C. to about 0° C.

29. A diamond thrust bearing as recited in claim 27, wherein said malleable shim is cold formed at a temperature range from about 75° C. to about 10° C.

30. A diamond thrust bearing as recited in claim 27, wherein said malleable shim is cold formed at a temperature range from about 35° C. to about 20° C.

31. A diamond thrust bearing as recited in claim 25, wherein said plurality of bearing pad recesses are equidistantly spaced in said receiving surface of said bearing pad retainer in a circle concentric with said bearing pad retainer.

32. A diamond thrust bearing as recited in claim 25, wherein said plurality of bearing pad recesses are spaced about said bearing pad retainer so that the distance between each of said bearing pad recesses is less than the outside diameter of said diamond bearing pad.

33. A diamond thrust bearing as recited in claim 25, wherein said insertion end of said diamond bearing pad is beveled to facilitate insertion of said diamond bearing pad into said open receiving end of said insertion chamber.

34. A diamond thrust bearing as recited in claim 25, wherein said malleable shim is cold pressed at ambient temperature.

35. A diamond thrust bearing as recited in claim 25, wherein each of said bearing pad recesses further comprises an overflow chamber formed in said deformation end of said insertion chamber, said overflow chamber being so configured as to be capable of receiving a part of said malleable shim during cold forming.

36. A diamond thrust bearing as recited in claim 25, wherein said insertion chamber has a cross-sectional shape that is the same as that of said diamond bearing pad.

37. A diamond thrust bearing as recited in claim 36, wherein said diamond bearing pad has a cross-sectional shape that is circular.

38. A diamond thrust bearing for use in downhole drilling operations, said thrust bearing comprising:
  (a) an annular bearing pad retainer having a plurality of bearing pad recesses equidistantly spaced in a circle concentric with said annular bearing pad retainer, formed in a receiving surface thereof, each of said plurality of bearing pad recesses having a cylindrical insertion chamber, an open receiving end in said receiving surface of said annular bearing pad retainer and a deformation end in the bottom of said cylindrical insertion chamber;
  (b) a plurality of cylindrical diamond bearing pads, each of said diamond bearing pads being interference fitted into a corresponding one of said bearing pad recesses, and each of said diamond bearing pads comprising:
    (i) an insertion end interference fitted into said corresponding one of said insertion chambers; and
    (ii) a bearing end projecting from said receiving surface of said bearing pad retainer and terminating in a substantially planar bearing face, said substantially planar bearing face being coplanar in a predetermined bearing plane with the bearing faces of all of said plurality of diamond bearing pads; and (c) a plurality of malleable copper shims, one malleable copper shim being cold pressed at ambient temperature into each of said plurality of bearing pad recesses, said malleable copper shims each having an upper surface and a lower surface, said upper surface supporting said diamond bearing pad and said lower surface being cold formed into said deformation end of a corresponding one of said insertion chambers to position wherein said bearing face of said diamond bearing pad is coplanar with said predetermined bearing plane.

39. A diamond thrust bearing as recited in claim 38, wherein each of said bearing pad recesses further comprises an overflow chamber formed in said deformation end of said insertion chamber, said overflow chamber being so configured as to be capable of receiving a part of said support means during cold forming.

40. A diamond thrust bearing assembly for use in downhole drilling operations, said thrust bearing assembly comprising:

(a) a first bearing pad retainer free from heat induced stresses having a plurality of bearing pad recesses formed in a receiving surface thereof;

(b) a second bearing pad retainer free from heat induced stresses having a plurality of bearing pad recesses formed in a receiving surface thereof, said receiving surface of said first bearing pad retainer being disposed in an opposing position to said second bearing pad retainer;

(c) a plurality of diamond bearing pads interference fitted into each of said plurality of bearing pad recesses, each of said diamond bearing pads comprising:

(i) an insertion end interference fitted into a corresponding one of said bearing pad recesses; and (ii) a bearing end projecting from said receiving surface of said bearing pad retainer and terminating in a substantially planar bearing face, said substantially planar bearing face being coplanar with the bearing faces of said plurality of the diamond bearing pads in a predetermined bearing plane; and (d) support means for maintaining said substantially planar bearing faces of said diamond bearing pads coincident with a predetermined bearing plane, said support means being cold pressed in said bearing pad recess.

41. A diamond thrust bearing assembly as recited in claim 40, wherein said support means comprises a plurality of malleable shims, each of said malleable shims having an upper surface and a lower surface, said upper surface supporting said insertion end of each of said diamond bearing pads and said lower surface being cold formed into said deformation end of a corresponding one of said bearing pad recesses during cold pressing.

42. A diamond thrust bearing assembly as recited in claim 40, wherein said malleable shims are comprised of copper.

43. A diamond thrust bearing assembly as recited in claim 40, wherein said plurality of bearing pad recesses each comprise an insertion chamber formed in said receiving surface of said bearing pad retainer, said insertion chamber having an open receiving end in said receiving surface capable of accepting said support means and a deformation end in which said support means is cold formed.

44. A diamond thrust bearing assembly as recited in claim 40, wherein each of said bearing pad recesses further comprises an overflow chamber formed in said deformation end of said insertion chamber, said overflow chamber being so configured as to be capable of receiving a part of said support means during cold forming.

* * * * *